(12) United States Patent
Gventer

(10) Patent No.: US 6,785,565 B2
(45) Date of Patent: Aug. 31, 2004

(54) COMMUNICATIONS DEVICE HAVING A SLIDING KEYPAD COVER

(75) Inventor: Brian Gventer, Ft. Worth, TX (US)

(73) Assignee: Nokia Corporation, Espoo (FI)

( * ) Notice: Subject to any disclaimer, the term of this patent is extended or adjusted under 35 U.S.C. 154(b) by 375 days.

(21) Appl. No.: 10/029,899

(22) Filed: Dec. 20, 2001

(65) Prior Publication Data

US 2003/0119544 A1 Jun. 26, 2003

(51) Int. Cl.[7] .............................................. H04B 1/38
(52) U.S. Cl. ............................ 455/575.4; 379/433.12
(58) Field of Search ............................ 455/90.1, 550.1, 455/575.1, 73, 575.4, 347, 351; 379/433.12, 433.11, 433.01

(56) References Cited

U.S. PATENT DOCUMENTS 6,370,362 B1 * 4/2002 Hansen et al. ............. 455/90.1
6,463,262 B1 * 10/2002 Johnson et al. ............ 455/90.1
6,647,249 B1 * 11/2003 Crisp ....................... 455/90.1
6,647,274 B1 * 11/2003 Alanen et al. ......... 379/433.12

* cited by examiner

Primary Examiner—Nguyen T. Vo
Assistant Examiner—Nhan T. Le
(74) Attorney, Agent, or Firm—Thomas B. Hayes; Thomas R. Weber

(57) ABSTRACT

The invention comprises a communications device having an improved spring mechanism for forcing open a sliding keypad cover. The spring mechanism comprises at least one guide rod, an end of each guide rod attached to the backside mechanics of the sliding keypad cover, each guide rod having a travel limit. The improved spring mechanism further comprising a guide frame having at least one guide hole, the at least one guide hole for receiving the at least one guide rod. The improved spring mechanism further comprises a spring positioned around the guide rod and between the at least one guide hole and the travel limit. The spring having a compressed state when the sliding keypad cover is closed. The spring mechanism further comprising a release mechanism coupled with the at least one guide rod when the sliding keypad cover is in the closed position.

16 Claims, 2 Drawing Sheets

COMMUNICATIONS DEVICE HAVING A SLIDING KEYPAD COVER

FIELD OF THE INVENTION

The present invention relates to a communications device and, more particularly, to an apparatus and method for operating the keypad cover of the communications device.

BACKGROUND

Communication devices having sliding keypad covers may use spring loaded mechanisms to force open the keypad cover. A popular spring mechanism for sliding open a keypad cover is the cantilever design, for example the cantilever design for the communications device taught in European Patent Application EP 0 939 533. The cantilever design of EP 0 939 533 comprises a spring having one end fixedly secured to the back side mechanics of the communications device and another end attached to a sliding mechanism, which is attached to the back side mechanics of the keypad cover. The spring is in an extended state when the keypad cover is closed creating a pulling force in the direction of the fixedly secured end of the spring. FIG. 2 illustrates a prior art spring mechanism utilizing a cantilever design for a communications device and is denoted generally as 10. The illustration of FIG. 1 comes from the referenced patent application and will be briefly discussed herein; any further detail required may be obtained from the referenced patent application.

Spring mechanism 10 comprises a guide rail 12, a traveler 14, a release mechanism 16, and a spring 18. Spring 18 has a looped end 20 secured to the backside mechanics of the mobile communications device and an opposite looped end attached to a lip of traveler 14. Traveler 14 may be secured to guide rail 12 through a slot 22, allowing traveler 14 to slide up and down slot 22. Traveler 14 may be secured to a clamp 24 fixed to backside mechanics of the keypad cover of the mobile communications device. Release mechanism 16 may comprise a push button 26 and a lever 28 for holding the position of the traveler when the keypad cover is in a closed position and releasing the traveler when the push button is activated. Lever 28 may be positioned over a beam of traveler 14 to secure the position of the traveler when the keypad cover is in a closed position. Push button 26 may force a rounded pin through an opening of a base, situated between the push button and lever, to lift lever 28 over the beam of traveler 14 when activated.

In the cantilever design of FIG. 2, spring 18 remains extended while the keypad cover is in a closed position. Therefore, while the spring is in an extended state, spring 16 produces a constant pulling force against traveler 14 in the direction of looped end 20. Upon activation of pushbutton 26, latch 28 is lifted up over the lip and traveler 14 is forced in the direction of the retracting spring. The spring mechanism applies a tension force against the spring creating a pulling force against the keypad cover when the keypad cover is closed. In the cantilever design, the spring mechanism contains many mechanical parts, such as the guide rail and the traveler, that may bind or become corroded over time and with use. For example, mechanical parts may bind from, for example, extensive use, or condensation may cause corrosion and, therefore, increase frictional forces thereby reducing force used to open the keypad cover. In addition, applying a tension force to the spring when the keypad cover is closed may eventually reduce the resiliency of the spring. The mechanical parts and the application of the spring in the cantilever design may reduce the force necessary to open the keypad cover and, therefore, affect the reliability of the device.

As may be seen, a more reliable spring mechanism for a communications device utilizing a sliding keypad cover could prove a useful article of manufacture.

SUMMARY

The present invention provides a method and apparatus for opening a sliding keypad cover of a communications device.

The invention provides a communications device having an improved spring mechanism for opening a sliding keypad cover. The communications device utilizes a spring mechanism constructed and utilized in such a way that the mechanics act to compress a spring when the keypad cover is closed. Therefore, a pushing force is applied against the keypad cover so that when a release mechanism is activated the keypad cover is forced open. The spring mechanism uses the force of a compressed spring to open the keypad cover with minimal mechanical parts; therefore providing a communications device having more reliable operation of the sliding keypad cover.

In an embodiment, the improved spring mechanism comprises at least one guide rod, an end of each guide rod attached to the backside mechanics of the sliding keypad cover, each guide rod having a travel limit. The improved spring mechanism further comprising a guide frame having at least one guide hole, the at least one guide hole for receiving the at least one guide rod. The improved spring mechanism further comprises a spring positioned around the guide rod and between the at least one guide hole and the travel limit. The spring having a compressed state when the sliding keypad cover is closed. The spring mechanism further comprising a release mechanism coupled with the at least one guide rod when the sliding keypad cover is in the closed position.

BRIEF DESCRIPTION OF THE DRAWINGS

For a more complete understanding of the present invention, including its features and advantages, reference is made to the detailed description of the invention, taken in conjunction with the accompanying drawings of which.

DETAILED DESCRIPTION

While the use and implementation of particular embodiments of the present invention are presented in detail below, it will be understood that the present invention provides many inventive concepts, which can be embodied in a wide variety of contexts. The specific embodiments discussed herein are mere illustrations of specific ways for making and using the invention and are not intended to limit the scope of the invention.

The invention provides for an improved communications device utilizing a sliding keypad cover and, more specifically, an improved spring mechanism providing more reliable and sustainable operation of the sliding keypad cover. The communications device utilizes spring mechanism having few moving parts and a compressed spring to apply a pushing force against a keypad cover when the keypad cover is in a closed position. As opposed to, for example, a cantilever design where more moving parts are required and the spring is forced to a stretched position when the keypad cover is in a closed position. The stretched spring asserting a pulling force that when released by a release mechanism forces the keypad cover to an open position. The pulling force of the cantilever design may over time and with extensive use become degraded, due to frictional forces created from binding and simply the resiliency degradation due to the tensional forces applied by the spring mechanism. The improved spring mechanism uses a simple design with fewer mechanical parts and uses force from the recoil of a compressed spring to force open a keypad cover.

Figure 1:
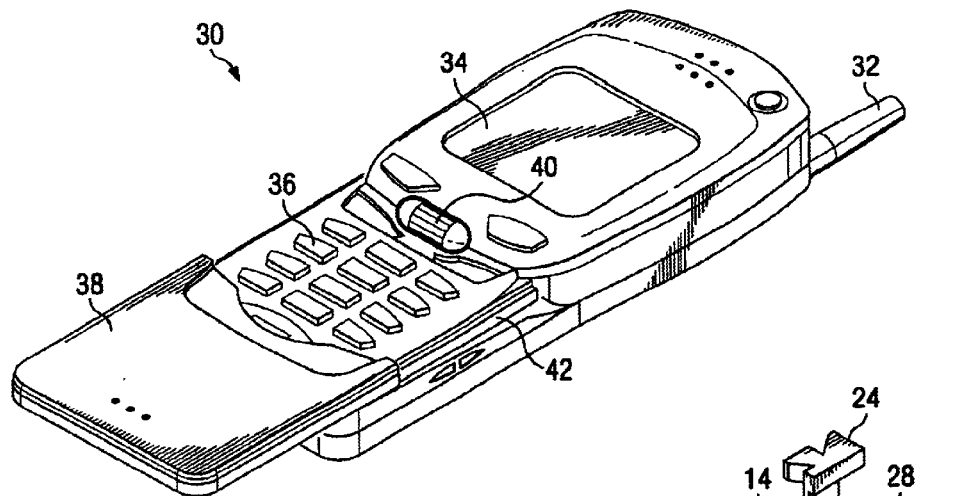
FIG. 1 illustrates a communications device according to an embodiment of an invention.
Figure 2:
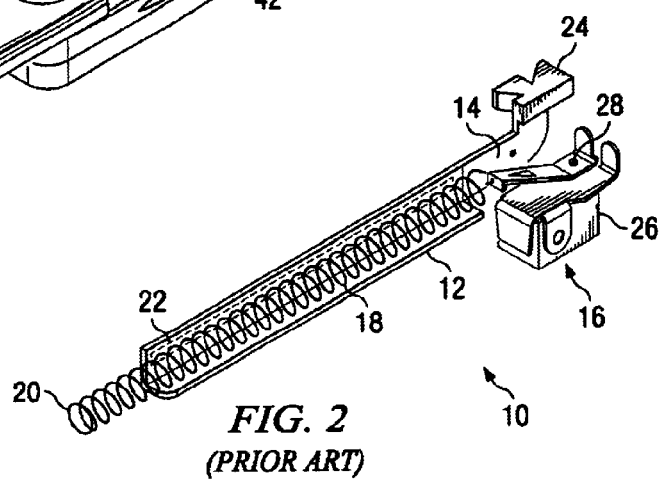
FIG. 2 illustrates a prior art spring mechanism utilizing a cantilever design for a communications device.

Referring now to FIG. 1, wherein a communications device according to an embodiment of an invention is illustrated and denoted generally as 30. Communications device 30 comprises a antenna 32 for sending and receiving RF signals, a LCD display 34 for displaying visual information, a keypad 36 for receiving user input, a keypad cover 38, and a release button 40 for releasing a spring that forces keypad cover 38 to an open position. Keypad cover 38 may comprises a guide rail fitted within a guide slot 42 formed in the mechanics of communications device 30. Keypad cover 38 when in a closed position compresses a spring, causing the spring to apply a pushing force against keypad cover 38. Release button 40 when activated releases the spring forcing keypad cover 38 into its open position.

Figure 3:
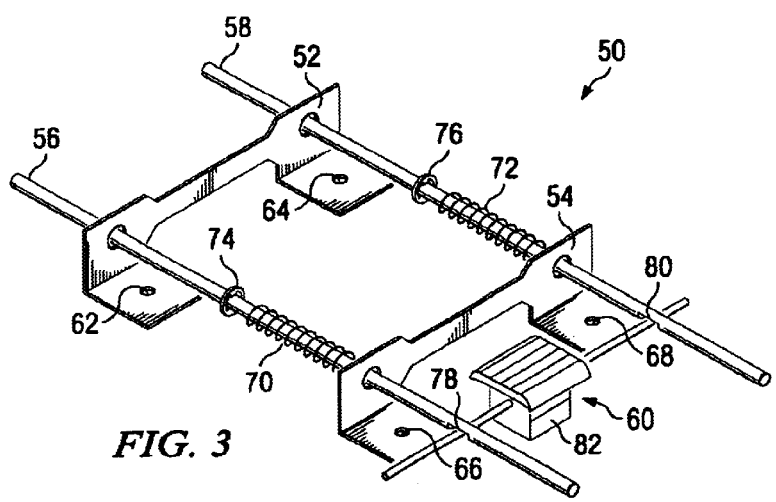
FIG. 3 illustrates a spring mechanism for opening a keypad cover of a communications device.

Referring now to FIG. 3, wherein a spring mechanism for opening a keypad cover of a communications device is illustrated and denoted generally as 50. Spring mechanism 50 comprises a front and rear guide rail 52, 54, guide rods 56, 58, and a release mechanism 60. Each guide rail 52, 54 comprises a hole bored on its outer parameter, and when mounted to the mechanics of a communications device using mounting holes 62, 64, 66, and 68 align to provide a line of travel for guide rods 56 and 58. Each guide rod 56, 58 comprises a spring 70, 72, travel limits 74, 76, such as a metal or rubber washer that has a dimension greater than that of the bored holes in guide rail 52 and 54, and catches 78 and 80. Catches 78, 80 may be a formation in the guide rods, that may be of any shape, for receiving an object of the dimensions required to catch guide rods 56, 58. Release mechanism 60 comprises a push button 82 having an extension of a similar shape as the catches and traversing and mating with catch 78 and 80. Push button 82 may be a spring activated switch that may be electrically coupled to a Printed Circuit Board (PCB) of a mobile communications device. In practice, guide rods 56 and 58 would have each end opposite release mechanism 60 attached to backside mechanics of a keypad cover; and, when the keypad cover is closed, the spring will be compressed between travel limits 74 and 76 and guide rail 54. Upon activation of push button 82, guide rods 56 and 58 are released forcing keypad cover to an open position; the limit of travel for the guide rods are limited by travel limits 74, 76 and guide rail 52.

Figure 4:
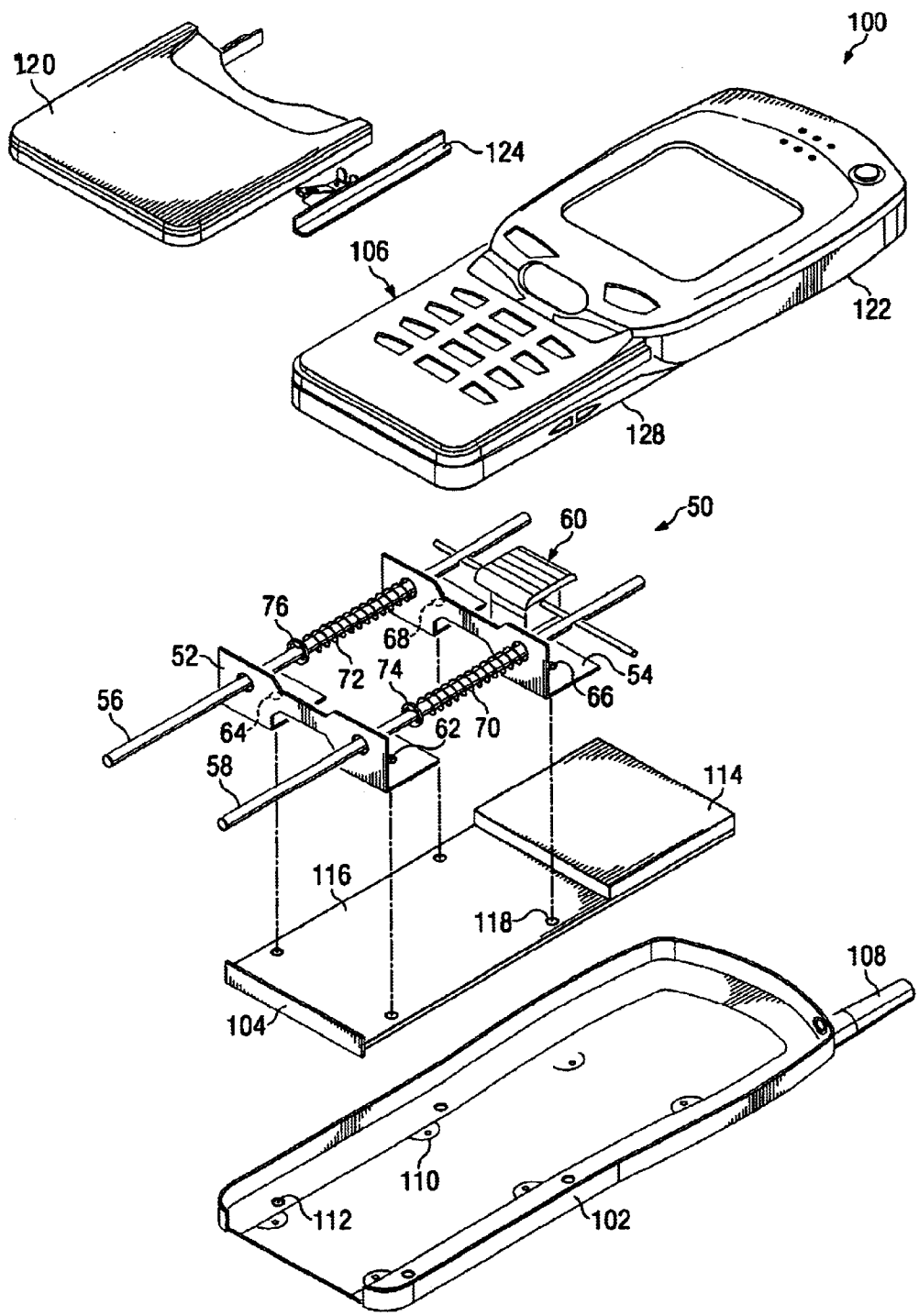
FIG. 4 illustrates an exploded view of a communications device employing the spring mechanism of FIG. 3.

Referring to FIG. 4, wherein an exploded view of a communications device having a sliding keypad cover is illustrated and denoted generally as 100. Communications device 100 comprises a back cover 102, a Printed Circuit Board (PCB) 104, spring mechanism 50, and a front cover 106. Back cover 102 may comprise an antenna 108 that can be coupled to PCB 104 for receiving radio frequency (RF) signals and a plurality of mounting members 110, 112 for receiving PCB 104 and spring mechanism 50. PCB 104 may comprise a LCD 114, device electronics 116 for receiving user input, performing functions, and driving LCD 114, and a plurality of mounting holes 118 for receiving mounting studs securing PCB 104 to back cover 102. Spring mechanism 50 includes mounting holes 62, 64, 66, and 68 for receiving mounting studs securing spring mechanism 50 to back cover 102. Front cover 106 may comprise a sliding keypad cover 120 and a face plate 122. Sliding keypad cover 120 may comprise a slide frame 124, allowing the keypad cover to slide up and down the frame. Face plate 122 may comprise a keypad 126, openings for exposing LCD 114 and release mechanism 60, and side track 128 for receiving slide frame 124.

PCB 104 and spring mechanism 50, without guide rods 56, 58, may be secured to back cover 102 and release mechanism 60 may be attached to PCB 104. Once PCB 104, spring mechanism 50, and release mechanism 60 are secured, face plate 122 may be positioned over spring mechanism 50 and secured to back cover 102. Guide rods 56, 58, without springs 70, 72 and travel limits 74, 76, may be positioned through the first set of guide holes. Springs 70, 72 and travel limits 74, 76 may then be placed onto guide rods 56, 58. Then guide rods 56, 58 may be placed through the second set of guide holes through an opening in the top of face plate 122. Sliding keypad cover 120 may then be coupled with slide track 128 and guide rods 56, 58 coupled to the backside mechanics of keypad cover. Release mechanism 60 and keypad cover 120 may then be manipulated until release mechanism 60 mates with catches 78, 80.

While this invention has been described with reference to particular embodiments, this description is not intended to be limiting. Various modifications and combinations of the illustrative embodiments, as well as other embodiments of the invention, will be apparent to persons skilled in the art. It is, therefore, intended that the appended claims encompass any such modifications or embodiments.

What is claimed is:

1. A communications device having a sliding keypad cover, the keypad cover exposing a keypad when forced open and hiding the keypad when closed, the communications device comprising:

at least one guide rod, an end of each guide rod coupled to the mechanics of the sliding keypad cover, each guide rod having a travel limit;

a guide frame having at least one guide hole, the at least one guide hole for receiving the at least one guide rod, the guide frame coupled to the mechanics of the communications device;

a spring positioned around the guide rod between the at least one guide hole and the travel limit, the spring having a compressed state when the sliding keypad cover is closed; and a release mechanism for coupling with the at least one guide rod when the sliding keypad cover is in the closed position and for releasing the at least one guide rod when the release mechanism is activated.

2. The communications device as recited in claim 1, wherein the guide frame further comprises:

a first guide rail having a first set of guide holes; and a second guide rail having a second set of guide holes, the first set of guide holes aligned with the second set of guide holes.

3. The communications device as recited in claim 1, wherein the release mechanism comprises:

a push button for coupling to electronics of the communications device and the at least one guide rod.

4. The communications device as recited in claim 3, wherein the guide rod has a groove formed on the surface for receiving the push button.

5. The communications device as recited in claim 3, wherein the guide rod has a groove formed in the surface for receiving the push button.

6. A method of forcing open a sliding keypad cover of a communications device, the keypad cover exposing a keypad when forced open and hiding the keypad when closed, the method comprising the steps:

coupling a guide rod to the mechanism of the sliding keypad cover, each guide rod having a travel limit;

securing a guide frame having at least one guide hole to mechanics of the communications device, the at least one guide hole for receiving the at least one guide rod;

positioning a spring around the guide rod between the at least one guide hole and the travel limit, the spring having a compressed state when the sliding keypad cover is closed; and coupling a release mechanism to the at least one guide rod.

7. The method of forcing open a keypad cover of a communications device as recited in claim 6 further comprising the steps:

securing a first guide rail having a first set of guide holes and a second guide rail having a second set of guide holes to the mechanics of the communications device, the first set of guide holes aligned with the second set of guide holes; and positioning a first and second guide rod through aligned guide holes.

8. The method of forcing open a keypad as recited in claim 6, wherein the release mechanism further comprises a push button coupled to the at least one guide rod.

9. The method of forcing open a keypad cover as recited in claim 8, wherein the push button is further coupled to the electronics of the communications device.

10. The method of forcing open a keypad cover as recited in claim 8, wherein the at least one guide rod comprises a groove formed on the surface for receiving the push button.

11. The method of forcing open a keypad cover as recited in claim 8, wherein the at least one guide rod comprises a groove formed in the surface for receiving the push button.

12. A spring mechanism used in a communications device having a sliding keypad cover, the keypad cover exposing a keypad when forced open and hiding the keypad when closed, the communications device comprising:

at least one guide rod, an end of each guide rod coupled to the mechanics of the sliding keypad cover, each guide rod having a travel limit;

a guide frame having at least one guide hole, the at least one guide hole for receiving the at least one guide rod, the guide frame coupled to the mechanics of the communications device;

a spring positioned around the guide rod between the at least one guide hole and the travel limit, the spring having a compressed state when the sliding keypad cover is closed; and a release mechanism for coupling with the at least one guide rod when the sliding keypad cover is in the closed position and for releasing the at least one guide rod when the release mechanism is activated.

13. The spring mechanism as recited in claim 12, wherein the guide frame further comprises:

a first guide rail having a first set of guide holes; and a second guide rail having a second set of guide holes, the first set of guide holes aligned with the second set of guide holes.

14. The spring mechanism as recited in claim 12, wherein the release mechanism comprises:

a push button for coupling to electronics of the communications device and the at least one guide rod.

15. The spring mechanism as recited in claim 14, wherein the guide rod has a groove formed on the surface for receiving the push button.

16. The spring mechanism as recited in claim 14, wherein the guide rod has a groove formed in the surface for receiving the push button.

* * * * *